(12) United States Patent
McDonald et al.

(10) Patent No.: US 7,081,441 B2
(45) Date of Patent: Jul. 25, 2006

(54) COMPOSITION FOR CLEANING AND/OR TREATING SURFACES

(75) Inventors: Michael Ray McDonald, Middletown, OH (US); Helen Frances O'Connor, Loveland, OH (US); Robert Henry Rohrbaugh, Hamilton, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 236 days.

(21) Appl. No.: 10/440,836

(22) Filed: May 19, 2003

(65) Prior Publication Data

US 2003/0220221 A1 Nov. 27, 2003

Related U.S. Application Data

(60) Provisional application No. 60/383,240, filed on May 24, 2002.

(51) Int. Cl.
 *C11D 3/12* (2006.01)
 *C11D 3/33* (2006.01)

(52) U.S. Cl. .................. 510/405; 510/418; 510/488; 510/490; 510/508; 510/108

(58) Field of Classification Search .............. 510/405, 510/403, 418, 488, 490, 508, 108
See application file for complete search history.

(56) References Cited

U.S. PATENT DOCUMENTS

| | | | |
|---|---|---|---|
| 4,431,550 A * | 2/1984 | Block | .......................... 507/124 |
| 4,992,199 A | 2/1991 | Meyer et al. | |
| 5,316,832 A | 5/1994 | Groten et al. | |
| 5,576,282 A | 11/1996 | Miracle et al. | |
| 5,693,442 A * | 12/1997 | Weiss et al. | ................... 430/66 |
| 5,707,950 A | 1/1998 | Kasturi et al. | |
| 5,759,980 A | 6/1998 | Russo et al. | |
| 5,888,955 A | 3/1999 | Foley et al. | |
| 6,172,021 B1 | 1/2001 | Ofosu-Asante et al. | |
| 6,207,130 B1 | 3/2001 | Kareiva et al. | |
| 6,281,181 B1 | 8/2001 | Vinson et al. | |
| 6,322,890 B1 * | 11/2001 | Barron et al. | ................ 428/402 |
| 6,369,183 B1 | 4/2002 | Cook et al. | |
| 6,562,142 B1 | 5/2003 | Barger et al. | |
| 6,569,261 B1 | 5/2003 | Aubay et al. | |
| 6,660,713 B1 | 12/2003 | Carter et al. | |
| 6,696,585 B1 * | 2/2004 | Wellinghoff et al. | .......... 556/10 |
| 6,802,878 B1 * | 10/2004 | Monroe | ....................... 51/307 |
| 2002/0016250 A1 | 2/2002 | Hayakawa et al. | |
| 2002/0028288 A1 | 3/2002 | Rohrbaugh et al. | |
| 2002/0045010 A1 | 4/2002 | Rohrbaugh et al. | |
| 2002/0053547 A1 * | 5/2002 | Schlegel et al. | ............. 210/688 |
| 2002/0077249 A1 * | 6/2002 | Schlegel et al. | ............. 502/328 |
| 2002/0102359 A1 | 8/2002 | Rohrbaugh et al. | |
| 2002/0150678 A1 | 10/2002 | Cramer et al. | |
| 2002/0151634 A1 | 10/2002 | Rohrbaugh et al. | |
| 2002/0160159 A1 | 10/2002 | McDonald et al. | |
| 2002/0160224 A1 | 10/2002 | Barger et al. | |
| 2002/0176982 A1 | 11/2002 | Rohrbaugh et al. | |
| 2002/0192366 A1 | 12/2002 | Cramer et al. | |

FOREIGN PATENT DOCUMENTS

| | | |
|---|---|---|
| JP | 53045314 | 4/1978 |
| WO | WO 97/48927 A1 | 12/1997 |
| WO | WO 99/50203 A1 | 10/1999 |
| WO | WO 00/09578 A1 | 2/2000 |
| WO | WO 01/96511 A2 | 12/2001 |
| WO | WO 01/96512 A2 | 12/2001 |

OTHER PUBLICATIONS

Bellare et al. *Controlled Environment Vitrification System: An Improved Sample Preparation Technique* J. Electron Microscopy Technique, 1988, 10: 87-111.

* cited by examiner

*Primary Examiner*—Lorna M. Douyon
(74) *Attorney, Agent, or Firm*—Stephen T. Murphy; Kim William Zerby; Steven W. Miller

(57) ABSTRACT

A composition for treating and/or cleaning surfaces comprises a nanoparticle component selected from the group consisting of metal oxyhydroxides, modified metal oxyhydroxides and mixtures thereof; a buffer/modifier component; optionally, an adjunct ingredient; and the balance of the composition being a polar solvent.

14 Claims, No Drawings

COMPOSITION FOR CLEANING AND/OR TREATING SURFACES

CROSS-REFERENCES TO RELATED APPLICATIONS

This application claims priority under 35 U.S.C. § 119(e) to U.S. Provisional Application Ser. No. 60/383,240 filed May 24, 2002.

FIELD OF THE INVENTION

The present invention relates to a cleaning/surface modification composition, and processes of making and using same.

BACKGROUND OF THE INVENTION

Cleaning products that leave a surface with an aesthetically pleasing, long lasting, durable finish e.g. spot-free or shiny are desired. In theory, nanoparticles can be employed to provide such a finish. Ideally, the particles would be contained in a cleaning/surface modification composition and applied during the cleaning process. Unfortunately, due to formulation and use difficulties the need for such a composition and process has gone unfulfilled. While not being bound by theory, Applicants believe that the roots of such formulation difficulties include the propensity of nanoparticles to remain dispersed via Brownian motion in solution, especially in the presence of surfactants, and the incompatibility of nanoparticles with certain anions and cations including, but not limited to those found in tap water (i.e. $Mg^{2+}$, $Ca^{2+}$, $Na^+$, $SO_4^{2-}$, $Cl^-$, $H^+$, undissolved solids, and $CO_3^{2-}$) which is typically used as a diluent and/or a rinse liquid.

During the course of their research, Applicants have surprisingly discovered that, when the proper relationship of buffer/modifier and nanoparticle type, and pH is achieved, the aforementioned problems are resolved.

SUMMARY OF THE INVENTION

Applicants' invention relates to fluid and solid compositions that can be used to modify the surface properties of a surface and optionally clean said surface. Kits containing such compositions, processes of making such compositions and methods of using same are disclosed.

DETAILED DESCRIPTION OF THE INVENTION

Definitions

As used herein, the term modified metal oxyhydroxides means those metal oxyhydroxides having at least one carboxylic acid attached thereto.

As used herein the term fluid means capable of flowing under pressure. Non-limiting examples of fluids include, gels, suspensions and solutions.

As used herein the term "test water" means distilled deionized water to which a sufficient amount of $Na_2CO_3$ has been added to provide said water with 50 ppm $Na_2CO_3$.

As used herein, the articles a and an when used in the specification and claims means "at least one" of the material that is claimed or described.

As used herein, the term polar solvent refers to solvents that are miscible with water. It should be understood that water is a polar solvent.

Unless stated otherwise, as used herein the term "nanoparticle" means a particle having three dimensions one of said dimensions' having a mean value, as determined by Applicants' cryo-transmission electron microscopy method, of from about 1 nm to less than about 500 nm.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources. Thus, it should be understood that solid forms of Applicants' composition are substantially free of solvents, but that such compositions may contain solvents that are part of the raw materials or processing aids used to form such composition.

Through out Applicants' specification and claims embodiments of Applicants' invention are defined by physical parameters. Such parameters are quantified by the test methods contained in the present specification.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Composition

Applicants' compositions provide surface modification benefits, and may provide cleaning benefits. Surfaces that can be modified and/or cleaned by Applicants' compositions include, but are not limited to, coated and uncoated metal, plastic, wood, ceramic, glass or composite surfaces. Such compositions may be in any form, for example, a concentrate, liquid, gel, foam, granule or tablet. Said compositions comprise a nanoparticle selected from the group consisting of metal oxyhydroxides, modified metal oxyhydroxides and mixtures thereof; a buffer or modifying agent that is typically a monoacid; and when in fluid form, a polar solvent. Applicants' compositions are typically formulated so that the composition's nanoparticles have a positive charge under in use conditions. Regardless of the form of Applicants' compositions, such compositions are typically formulated such that, when said compositions are in or diluted to ready-to-use concentrations, the solution will typically have a pH of from about 1 to about 6.5, or a pH from about 1 to about 6. While not being bound by theory, it is believed that in aqueous solution, with the correct combination of pH and buffer/modifier type, the metal oxyhydroxides of the present invention are converted into and maintained as nanoparticulate sized modified metal oxyhydroxides.

Suitable metal oxyhydroxides include metal oxyhydroxides selected from the group consisting of aluminum oxyhydroxide; metal oxyhydroxides that are isomorphous to aluminum oxyhydroxide, such as scandium oxyhydroxide and iron oxyhydroxide; and mixtures thereof. Aluminum oxyhydroxide is sold under the trade name of Catapal®, Disperal® or Dispal® by North American Sasol, Houston, Tex., USA. Suitable modified metal oxyhydroxides include modified metal oxyhydroxides selected from alumoxanes, feroxanes, scandoxanes and mixtures thereof. Suitable alumoxanes include alumoxanes selected from the group consisting of aklyalumoxane, akylaluminoxane, poly(alklyalumoxane), poly(alkylaluminum oxide), poly(hydrocartylaluminum oxide) and mixtures thereof. Suitable feroxanes include feroxanes selected from the group consisting of aklyferoxane, akylferoxane, poly(alklyferoxane), poly(alkyliron oxide), poly(hydrocartyliron oxide) and mixtures thereof. Suitable scandoxanes include scandoxanes selected from the group consisting of aklyscandoxane, akylscandoxane, poly(alklyscandoxane), poly(alkylscandium oxide), poly(hydrocartylscandium oxide) and mixtures thereof. Alumoxanes may be prepared by reacting particulate material, including but not limited to nano or micron-sized particles with carboxylic acids. Examples of methods of preparing alumoxanes are described in: U.S. Pat. Nos. 6,207,130 6,322,890, and 6,369,183; European Publication 0575695 B1; and PCT Publications: WO 99/50203 A1 and WO 00/09578. Depending on the carboxylic acid, the reaction mixture may or may not require heating, and if heating the mixture is required then the mixture is heated to reflux for up to several days. Methods of preparing suitable nanoparticulate sized modified metal oxyhydroxides are disclosed in examples of the present specification.

Nanoparticles have a variety of shapes including, but are not limited to spherical, parallelpiped-shaped, tube shaped, rod shaped, and disc or plate shaped. Regardless of the shape of a nanoparticle, such particle will have three dimensions: length, width and height. In one embodiment of the present invention at least one of said dimensions has a mean value, as measured by Applicants' cryo-transmission electron microscopy method, of from about 1 nm to less than about 500 nm. In still another embodiment of the present invention, at least one of said dimensions will have a mean value from about 2 nm to less than about 120 nm. In one aspect of Applicants' invention, fluid compositions comprise nanoparticles that have the aforementioned dimension limitations and a platelet shape.

In addition to a suitable nanoparticle, Applicants' composition comprises a suitable buffer/modifier, that may be a poly or monoacid. The hydrophilicity or hydrophobicity of the buffer/modifier used can have an impact on the hydrophilicity or hydrophobicity of the substrate after the composition is applied to the substrate. If a hydrophilic surface is desired hydrophilic acids will be useful and if a hydrophobic surface is desired hydrophobic acids will be useful. Suitable buffer/modifiers include acids such as carboxylic acids. Examples of suitable carboxylic acids include, but are not limited to, aminocaproic acid, lysine, acetic acid, methoxyacetic acid, methoxyethoxy acetic acid, methoxyethoxyethoxy acetic acid, glycine, glycolic acid, lactic acid, p-hydroxybenzoic acid, gallic acid, gluconic acid, formic acid, citramalic acid, ethylenediamine-N,N'-diacetic acid (N,N'-ethylene diglycine), dimethylolpropionic acid (2,2-bis(hydroxymethyl)propionic acid), hexanoic acid, octanoic acid, 4-aminobenzoic acid, benzoic acid, 3-phenylpropionic acid, 8-phenyloctanoic acid, biphenylacetic acid, napthalene-2-acetic acid, diphenolic acid (4,4-bis(4-hydroxyphenyl)valeric acid), N-acylated sarcosinates, 10-phenothiazinepropionic acid, phthalic acid, o-phenylenediacetic acid, m-phenylenediacetic acid, p-phenylenediacetic acid, ULTRASIL™ CA-1 by Noveon, Inc. of Cleveland, Ohio, USA (dimethicone PEG-7 phthalate), 3-hydroxypropionic acid, maleic acid, citric acid, lactic acid, malic acid, tartaric acid, malonic acid, succinic acid, and carboxy silicones and mixtures thereof. As will be appreciated by the skilled artisan, selection of an acid or acid mixture is driven by the desired surface properties that the artisan intends that the composition provide.

In one aspect of Applicants' invention, solid forms of Applicants' composition comprise, from about 20% to about 100% of a mixture of: a nanoparticle selected from the group consisting of metal oxyhydroxides, modified metal oxyhydroxides and mixtures thereof, and a buffer or modifying agent that is typically a monoacid. In such aspect of the invention, the molar ratio of combined metal oxyhydroxides and modified metal oxyhydroxides to buffer/modifier component is typically from about 0.1 to about 40. In another aspect of Applicants' invention, solid forms of Applicants' composition comprise, from about 25% to about 95% of a mixture of: a nanoparticle selected from the group consisting of metal oxyhydroxides, modified metal oxyhydroxides and mixtures thereof, and a buffer or modifying agent that is typically a monoacid. In such aspect of the invention, the molar ratio of combined metal oxyhydroxides and modified metal oxyhydroxides to buffer/modifier component is typically from about 0.1 to about 30. In still another aspect of Applicants' invention solid forms of Applicants' composition comprise, from about 25% to about 90% of a mixture of: a nanoparticle selected from the group consisting of metal oxyhydroxides, modified metal oxyhydroxides and mixtures thereof; and a buffer or modifying agent that is typically a monoacid. In such aspect of the invention, the molar ratio of combined metal oxyhydroxides and modified metal oxyhydroxides to buffer/modifier component is typically from about 0.2 to about 20. Optional adjunct ingredients make up the balance of Applicants' solid compositions.

In another aspect of Applicants' invention, concentrated fluid forms of Applicants' composition comprise, from about 0.5% to about 50%, from about 0.5% to about 25% or from about 0.5% to about 15% of a suitable nanoparticle, and from about 2.5% to about 40%, from about 3% to about 40%, or from about 4% to about 40% of a suitable buffer/modifier.

In still another aspect of Applicants' invention, ready to use/in use fluid form of Applicants' compositions comprise, from about 0.01% to about 4%, from about 0.02% to about 3%, or from about 0.03% to about 2% of a suitable nanoparticle and from about 0.05% to about 7%, from about 0.1% to about 5% or from about 0.15% to about 4% of a suitable buffer/modifier.

The balance of any fluid form of Applicants' composition, whether in concentrate or ready to use/in use form is a polar solvent. Suitable polar solvents include, but are not limited to, water, alcohols and mixtures thereof.

Adjunct Ingredients

Applicants' compositions may contain optional adjunct ingredients including, but not limited to, surfactants, perfumes colorants, viscosity modifiers such as hydroxyethyl cellulose, and pH adjusters. Suitable ingredients for the cleaning compositions, particularly surfactants therefore, are described in U.S. Pat. No. 5,888,955, U.S. Pat. No. 6,172,021, and U.S. Pat. No. 6,281,181. Examples of optional surfactants include, but are not limited to, surfactants selected from the group consisting of ethoxylated nonionic alcohols, alkyl glucosides, silicon super wetters and mixtures thereof. Ethoxylated nonionic alcohols are sold under the trade names Tergitol®, Neodol® and Dobanol® by The Royal Dutch Shell Group of Rotterdam, Netherlands. Alkyl glucosides are sold under the trade name APG® by Cognis Corporation of Cincinnati, Ohio U.S.A. Silicon super wetters are sold under the trade names Q2-5211 and Q2-5212 by the Dow Corning Co. of Midland Mich. U.S.A. Such surfactants are typically useful when the composition alone does not wet the surface to be modified to the desired degree.

Solid forms of Applicants' composition may comprise from about 0.5% to about 50%, from about 5% to about 35%, or from about 5% to about 20% of a suitable surfactant. Concentrated fluid forms of Applicants' compositions may comprise from about 0.1% to about 50%, from about 0.1% to about 25%, or from about 0.1% to about 15% of a suitable surfactant. Ready to use/in use fluid form of Applicants' compositions may comprise from about 0.01% to about 7%, from about 0.02% to about 6%, or from about 0.03% to about 5% of a suitable surfactant.

When a fluid form of Applicants' composition comprises one or more optional adjunct ingredients, the balance of said composition, whether in concentrate or ready to use/in use form is a polar solvent.

Process of Making

Solid forms of the present invention can be formed by combining the requisite components of Applicants' solid compositions or by forming a fluid composition as detailed herein and then evaporating or otherwise driving off the polar solvent.

Concentrated and ready to use/in use forms of the present invention can be formed by combining the required separate components, or via a "top down" process wherein a nanoparticle dispersion is produced by combining the micron size or greater inorganic particle with an organic acid in a polar solvent. In one aspect of Applicants' "top down" process the composition is heated at room temperature or greater for at least several minutes. Such processing conditions are believed to increase the rate at which the larger particles are converted to nanoparticles. Concentrated nanaoparticle dispersions produced according to the "top down" process are typically combined with additional polar solvent and, optionally, additional cleaning materials.

Method of Use

Applicants' compositions, when in solid or fluid concentrate forms are typically diluted with a desired amount of polar solvent to form a ready-to-use solution. Whether the composition is already in ready-to-use form or such ready-to-use form is made from a solid or fluid concentrate, the benefits of Applicants' invention can be obtained by contacting a surface before, during or after cleaning said surface, with Applicants' invention. Methods of contacting a surface with Applicants' composition include, but are not limited to, the use of a sprayer, sponge, or fabric. Optionally, after contacting said surface with Applicants' invention, said surface may be rinsed, preferably with tap or dionized water. In one aspect of the method of use, wherein Applicants' composition is applied after or independently of the wash process, a thin wet film of Applicants' composition is applied to a surface. Preferably such thin wet film is free of imperfections such as bubbles and dry spots.

While the desired contact angle of any surface varies from surface to surface, generally, a surface is contacted with a sufficient amount of Applicants' composition such that the contact angle of said surface is reduced or increased by at least 10%, at least 20% or at least 30%. In one aspect of Applicants' invention, the dry film that results from contacting a surface with Applicants' composition comprises greater than or equal to about 0.05 μg of nanoparticle per $cm^2$ of treated surface. In another aspect of Applicants' invention, the dry film that results from contacting a surface with Applicants' composition comprises less than or equal to about 3 μg of nanoparticle per $cm^2$ of treated surface.

Numerous variations of the compositions and the method described herein are possible. Variations and/or additional steps can be taken to increase the durability of the coating formed by Applicants' nanoparticle composition. For example, heat can be applied to increase the durability of a coating.

Components of a Cleaning Kit

The component materials and implements for carrying out the methods described herein can be provided in the form of a kit. In one non-limiting embodiment, the components of such a kit may comprise: a bottle of cleaning composition, a bottle of treating composition (which also may be referred to as a "finishing composition" or "coating composition"), an applicator, a spray device, and a filter for the spray device. In another embodiment a single product provides cleaning and finishing benefits. It should be understood that the components of the kit are only one example of such a kit, and other kits could comprise fewer, or more components, or different components. Any suitable components can be used. For example, the applicator could be a sponge, a rag, a cloth, a spray device, a squeegee, or other type of applicator. The kit may further comprise instructions for use. Such instructions for use may, for example, include instructions that instruct the user to spray on the treating composition using one pass with a sprayer. The instructions may further instruct the user to completely wet the surface of the surface without delaying the spray over any portion of the surface of the vehicle, or any other instructions necessary to form the desired coating. In other embodiments, for example, the instructions could instruct the user to wash segments of the car completely (prerinse, wash, rinse) before moving to the next section.

Optional Advantages and Benefits

The compositions, in certain embodiments, are advantageous in that they can be, as discussed above, applied to surfaces as a cleaning composition, as opposed to merely as a final coating after cleaning. The compositions can, in certain embodiments, thus, be scrubbed or otherwise agitated when applied, and it is not necessary to follow a meticulous application regime and/or to apply the composition to the surface only using purified water. The compositions and methods can in some embodiments provide the surface with a hydrophilic coating. In some embodiments that compositions and method can modify a surface such that the contact angle of a surface treated with 2.5 $\mu g/cm^2$ of the nanoparticles has a contact angle of distilled water of less than or equal to about 60 degrees. The hydrophilicity in some of such embodiments may be sufficiently durable that it lasts through multiple rinses with water. In some embodiments, the composition will leave minimal to no residue on the surface.

The composition, system, and method of the present invention are well suited for use by consumers in hand washing and finishing automobiles and household surfaces. The composition, system, and method of the present invention, in certain embodiments, provides a durable, transparent, residue-free, hydrophilic nanoparticle film coating that covers the entire surface of the vehicle (or any desired portions thereof). The film coating, in certain embodiments, is not subject to spotting after being contacted repeatedly with water (such as rain water). In certain embodiments, there is no need to wax (and buff) or dry vehicles that are treated by this method. In addition, the system and method of the present invention can be adapted to be used in commercial operations, including but not limited to car washes. The system and method may also be used to provide at least a temporary coating on new and other vehicles for shipment from the manufacturer to their final destination.

TEST METHODS

Through out Applicants' specification and claims embodiments of Applicants' invention are defined by physical parameters. Such parameters are quantified by the following test methods:

Cryo-Transmission Electron Microscopy Method

For cryo-TEM study, samples containing nanoparticles are prepared in a controlled environment vitrification system (CEVS) according to Bellare, J. R.; Davis, H. T.; Scriven, L. E.; Talmon, Y., Controlled environment vitrification technique, *J. Electron Microsc. Tech.,* 1988, 10, 87–111. A drop of the aqueous suspension is placed on a carbon-coated holey polymer support film mounted on a standard 300-mesh TEM grid (Ted Pella, Inc.). The drop is blotted with filter paper until it is reduced to a thin film (10–300 nm) spanning the holes (1–10 µm) of the support film. The sample is then vitrified by rapidly plunging it through a synchronous shutter at the bottom of the CEVS into liquid ethane at its freezing point. The vitreous specimen is transferred under liquid nitrogen into a Philips CM120 transmission electron microscope for imaging. The temperature of the sample is kept under −175° C. throughout the examination. TEM Magnification is calibrated using Latex Spheres on Diffraction Grating Replica (Ted Pella, Inc.). Dimensions of nanoparticles are then measured against this calibration with ca. 10% error.

Determination of Contact Angle

1. Sample Preparation
    A. A liquid dispersion is made of the nanoparticles that includes 0.1% by weight nanoparticles and 0.075% by weight Neodol® 91-6.
    B. The liquid dispersion is applied to a car panel (4 cm×5 cm, BASF clearcoat R10CG060H) with an airbrush to give 2.5 µg/cm² of the nanoparticles onto the car panel.
    C. The car panel is laid flat and the liquid is allowed to evaporate under ambient conditions. The car panel is allowed to remain flat for a minimum of 4 hours after the liquid has evaporated.
    D. The car panel is then rinsed with water (purified by reverse osmosis) at a flow rate of 1800 mL/min. for 10 seconds.
    E. The rinse water remaining on the panel is allowed to dry via evaporation of the liquid under ambient conditions. The car panel is allowed to remain flat for a minimum of 4 hours after the liquid has evaporated.
2. Contact Angle Measurement
    A. Deionized water (25 µL) is pipetted onto the substrate.
    B. Contact angle is measured immediately after the deionized water is pipetted onto the surface with a Reme-hart NRL C.A. goniometer (Model #100-00 115, with Olympus TGHM light source). The contact angle is the average of three measurements.

Method Determination of Charge at a given pH

1.) Sample Preparation

A 500-ppm stock solution of nanoparticles is prepared in deionized filtered Millipore water. The stock solution is stirred vigorously and allowed to come to equilibrium after approximately 2 hours. Then, 25 ml aliquots are transferred into 50 ml disposable polypropylene vials. The pH of each sample is adjusted by adding drop-wise 0.1N HCl/NaOH. The pH of each sample is recorded with a pH meter after a 3-point calibration at 4.0, 7.0 and 10.0 standard buffered solutions (VWR).

2.) Instrument Calibration

The Zeta Plus instrument is calibrated using BI-ZR3 colloidal pigment (Brookhaven). 400 ml of a 10 mM KCl solution is prepared in de-ionized filtered Millipore water. Approximately 1 ml of the BI-ZR3 concentrate is added to the 400 ml KCl solution. Insert into Zeta Plus. Attach electrodes to cable inside Zeta Plus. Initiate measurement. The conductance should be approximately 320 micro-siemens. The average zeta potential of 10 runs should be −53±4 mV. A lower value could indicate dirty electrodes. (See cleaning procedure below)

3.) Cleaning Procedure for Platinum Electrodes

Prior to the measurement electrodes are extensively cleaned with 2% Micro-90 surfactant solution and rinsed thoroughly with ethanol and filtered de-ionized Millipore water. Finally, electrodes are then rinsed with liquor of sample.

4.) Sample Measurement

The Zeta Plus (Brookhaven) is an automatic electrophoretic light scattering instrument for use with suspensions of particles from 10 nm to 30 microns. Accuracy and repeatability are generally within ±4% depending upon the quality of the sample. 1.5 ml of sample is transferred into four sided clear polyethylene disposable 10 mm cuvettes (BI-SCP Brookhaven). Clean platinum electrodes (see cleaning procedure above) are carefully inserted into the cuvettes. Take care that no bubbles are trapped between the electrodes and that they are completely immersed in the sample solution. Wipe all excess from the outside of the cuvette. Insert cuvette into ZetaPlus. Attach electrodes to cable inside Zeta Plus. The solution is allowed to come to thermal equilibrium at the desired temperature. If sample is significantly more viscous than water then the absolute viscosity must be measured and entered into the sample parameters otherwise initiate measurement using default aqueous parameters. The instrument will automatically optimize amount of scattered light and magnitude of current in order to generate an electric field around 15V/cm. The light scattered by the particles is Doppler shifted by an amount proportional to the velocity of the particles. The zeta potential is calculated using the average velocity and direction of the particle within this electric field. An average of 10 runs is recorded for each sample.

EXAMPLE(S)

The following provides several non-limiting examples of the present invention.

TABLE 1

Examples 1–13
The examples in Table 1 represent in use formulations that can be diluted from concentrates with tap water, distilled water, or softened water to achieve the desired in-use nanoparticle concentrations suitable for use as a cleaning composition.

| Example # | Nanoparticle (Wt %) | Molar Ratio Of Combined Metal Oxyhydroxides And Modified Metal Oxyhydroxides To Buffer/Modifier Component | Surfactant (Wt %) |
|---|---|---|---|
| 1 | lysine alumoxane nanoparticle (0.1%) | 35 | Neodol® 91-6 (0.1) |
| 2 | lysine alumoxane nanoparticle (0.1%) | 35 | Alkyl polyglucoside (0.1) |
| 3 | lysine alumoxane nanoparticle (0.5%) | 35 | Neodol® 91-6 (0.15) |
| 4 | lysine alumoxane nanoparticle (0.5%) | 35 | Alkyl polyglucoside (0.15) |
| 5 | lysine alumoxane nanoparticle (1.0%) | 35 | Neodol® 91-6 (0.15) |
| 6 | lysine alumoxane nanoparticle (1.0%) | 35 | Alkyl polyglucoside (0.15) |
| 7 | Methoxyethoxyethoxy acetic acid-alumoxane nanoparticle (0.5%) | 3 | Neodol® 91-6 (0.15) |
| 8 | Methoxyethoxyethoxy acetic acid-alumoxane nanoparticle (0.5%) | 3 | Alkyl polyglucoside (0.15) |
| 9 | Aminocaproic acid alumoxane (0.45%) | 1.1 | Neodol® 91-6 (0.15) |
| 10 | Aminocaproic acid alumoxane (0.275%) | 0.8 | Neodol® 91-6 (0.15) |
| 11 | Aminocaproic acid alumoxane (0.15%) | 1.6 | Neodol® 91-6 (0.15) |
| 12 | Aminocaproic acid alumoxane (22.5%) | 1.1 | Neodol® 91-6 (7.5) |
| 13 | Aminocaproic acid alumoxane (13.75%) | 0.8 | Neodol® 91-6 (7.5) |

*Balance of formula is water.

Example 14

Preparation of Modified Inorganic Nanoparticles

1. Dissolve 16.3 g L-Lysine (Aldrich 16,971-4) in 150 ml distilled $H_2O$ in a 250 ml beaker and adjust the pH to 2.5 with 15–20 ml concentrated HCl.
2. Disperse 20.00 g Catapal® B Boehmite Alumina (Condea) in 200 ml distilled $H_2O$ in a 1 L round bottom flask with a 1" eggbar style stir bar.
3. Add the L-Lysine solution to the Catapal® B dispersion and rinse the beaker with 50 ml distilled $H_2O$ pouring the rinse into the flask.
4. Stir rapidly at room temp for 10–15 minutes (solution becomes slightly viscous and very pale yellow and the alumina no longer settles out).
5. Transfer the contents of the flask to two 250 ml centrifuge tubes and centrifuge at 6000 rpm/1 hour/4° C. Three phases should result, a supernatant phase, a gel phase, and a particulate phase.
6. Pour off the supernatent and add the gel phases from each tube to a 500 ml beaker. Add 300 ml distilled $H_2O$ and stir to redisperse the gel.
7. Pour the redispersed gel into two 250 ml centrifuge tubes and centrifuge at 13,500 rpm/2 hours/4° C. Three phases should result, a supernatant phase, a gel phase, and a particulate phase.
8. Pour off the supernatent and wash the gel phase into a round bottom flask making sure not to add the larger particles particulate phase.
9. Evaporate to dryness with a rotovap at 70° C. and then transfer the pale yellow solid to a vacuum oven at 50° C. to dry overnight.

Example 15

Preparation of Modified Inorganic Nanoparticles

Modified inorganic nanoparticles can be prepared by either an in-situ or top-down synthesis approach. The in-situ approach combines a nanoparticulate metal oxyhydroxide material with the desired buffer/modifier to produce the modified inorganic nanoparticle. The metal oxyhydroxide can be combined as a solid or dispersion in liquid with a solid or solution form of the buffer/modifier. For example, the nanoparticulate aluminum oxyhydroxide (Disperal® P2) is combined with the buffer/modifier to produce the modified inorganic nanoparticle composition in the following procedure.

1. Disperse desired amount of nanoparticles in a polar solvent.
2. Add the desired amount of a solid or liquid form of the desired organic acid to the dispersion of nanoparticles.
3. Add optional adjunct ingredients at the desired level, i.e. optional surfactants, colorants.

In the top down synthesis, a large particulate metal oxyhydroxide material is combined with the desired buffer/modifier to produce the modified inorganic nanoparticle. The metal oxyhydroxide can be combined as a solid or dispersion in liquid with a solid or solution form of the buffer/modifier composition. The resulting composition can be heated at room temperature or greater for at least several minutes. For example, the nanoparticulate aluminum oxyhydroxide (Catapal® B) is combined with the buffer/modifier to produce the modified inorganic nanoparticle composition. The following example demonstrates the synthesis of a 2:1 by weight composition of aminocaproic acid:metaloxyhydroxide by the top down approach.

1. In a 1 L round bottom flask, dissolve 40.00 g 6-aminocaproic acid in 400 mL DI $H_2O$ and adjust pH of composition to $2.0 < x < 2.5$ with conc. HCl.
2. With acid solution stirring, slowly add 20.00 g metal oxyhydroxide.
3. Stir rapidly until metal oxyhydroxide is fully dispersed. (approx. 20–60 min.)
4. Centrifuge the resulting mixture for 60 min. at 6000 rpm, 4° C. This results in a three-phase system: clear liquid containing excess acid, cloudy alumoxane gel, light yellow unreacted metal oxyhydroxide solid.
5. Combine liquid and gel layers in 1 L round bottom (use funnel, rinse funnel with EtOH) and shake to redisperse material.
6. Rotovap to dryness under vacuum (100 rpm, start water bath at 40 C., raise to 70 C. after half of the liquid has evaporated).
7. Dry sample in vacuum oven.

8. Remove dried product from flask and grind product into powder using mortar and pestle.
9. The solid form of the nanoparticle modified with the carboxylic acid/buffer is then ready for formulation into solid or fluid form.

While particular embodiments of the subject invention have been described, it will be obvious to those skilled in the art that various changes and modifications of the subject invention can be made without departing from the spirit and scope of the invention. In addition, while the present invention has been described in connection with certain embodiments thereof, it is to be understood that this is by way of illustration and not by way of limitation and the scope of the invention is defined solely by the appended claims which should be construed as broadly as the prior art will permit.

What is claimed:

1. A composition for cleaning and/or treating surfaces comprising:
   a.) from about 0.5% to about 50% by weight of a nanoparticle component selected from the group consisting of metal oxyhydroxides, modified metal oxyhydroxides and mixtures thereof;
   b.) from about 2.5% to about 40% by weight of a buffer/modifier component comprising a monoacid selected from the group consisting of formic acid, lysine, aminocaproic acid, glycine and mixtures thereof;
   c.) optionally, an adjunct ingredient; and
   d.) the balance of said composition being a polar solvent;
   said composition having, when diluted with a sufficient amount of test water to form a solution having a nanoparticle concentration of 0.01% to 4% by weight, a pH of from about 1 to about 6.5.

2. A composition according to claim 1 comprising
   a.) from about 0.5% to about 25% by weight of said nanoparticle component; and
   b.) from about 3% to about 40% by weight of said buffer/modifier component.

3. A composition according to claim 2 comprising
   a.) from about 0.5% to about 15% by weight of said nanoparticle component; and
   b.) from about 4% to about 40% by weight of said buffer/modifier component.

4. The composition of claim 1 wherein said nanoparticle component comprises a material selected from an aluminum oxyhydroxide, a modified aluminum oxyhydroxide and mixtures thereof.

5. The composition of claim 1 wherein said nanoparticle component comprises a nanoparticle having at least one dimension having a mean value of from about 2 nm to less than about 120 nm.

6. The composition of claim 1 comprising from about 0.1% to about 50% by weight of a surfactant.

7. A composition according to claim 3:
   a.) wherein said nanoparticle component comprises a material selected from an aluminum oxyhydroxide, a modified aluminum oxyhydroxide and mixtures thereof, said nanoparticle having at least one dimension having a mean value of from about 2 nm to less than about 120 nm;
   b.) said composition having, when diluted with a sufficient amount of test water to form a solution having a nanoparticle concentration of 0.01% to 4% by weight, a pH of from about 1 to about 6.

8. A composition for cleaning and/or treating surfaces comprising:
   a.) from about 0.01% to about 4% by weight of a nanoparticle component selected from the group consisting of metal oxyhydroxides, modified metal oxyhydroxides and mixtures thereof;
   b.) from about 0.05% to about 7% by weight of a buffer/modifier component comprising a monoacid selected from the group consisting of formic acid, lysine, aminocaproic acid, glycine and mixtures thereof;
   c.) optionally, an adjunct ingredient; and
   d.) the balance of said composition being a polar solvent;
   wherein the composition has a pH of from about 1 to about 6.5.

9. A composition according to claim 8 comprising
   a.) from about 0.02% to about 3% by weight of said nanoparticle component; and
   b.) from about 0.1% to about 5% by weight of said buffer/modifier component.

10. A composition according to claim 9 comprising
    a.) from about 0.03% to about 2% by weight of said nanoparticle component; and
    b.) from about 0.15% to about 4% by weight of said buffer/modifier component.

11. The composition of claim 8 wherein said nanoparticle component comprises a material selected from an aluminum oxyhydroxide, a modified aluminum oxyhydroxide and mixtures thereof.

12. The composition of claim 8 wherein said nanoparticle component comprises a nanoparticle having at least one dimension having a mean value of from about 2 nm to less than about 120 nm.

13. The composition of claim 8 comprising from about 0.01% to about 7% by weight of a surfactant.

14. A composition according to claim 10 wherein said nanoparticle component comprises a material selected from an aluminum oxyhydroxide, a modified aluminum oxyhydroxide and mixtures thereof.

* * * * *